United States Patent [19]

Mayer

[11] 3,955,295

[45] May 11, 1976

[54] DATA BEARING CARD HAVING AN AESTHETIC, MAGNETIZABLE, COLORLESS, TRANSPARENT COATING THEREON

[75] Inventor: Simon Ernest Mayer, Lexington, Mass.

[73] Assignee: Roberta B. Kuhns, Lincoln, Mass.

[22] Filed: Aug. 1, 1975

[21] Appl. No.: 601,107

Related U.S. Application Data

[62] Division of Ser. No. 407,637, Oct. 18, 1973, Pat. No. 3,922,430.

[52] U.S. Cl. .................................. 40/2.2; 40/2 R; 252/62.51; 283/6; 283/7; 283/19; 283/58; 428/204; 428/206; 428/323; 428/325; 428/900
[51] Int. Cl.² .................. G09F 3/00; H01F 10/02
[58] Field of Search ............... 252/62.51; 427/128; 40/2.2; 428/323, 325, 900, 204, 206

[56] References Cited
UNITED STATES PATENTS

| | | | |
|---|---|---|---|
| 3,320,170 | 5/1967 | Vickery et al. | 252/62.51 |
| 3,922,430 | 11/1975 | Mayer | 428/325 |

*Primary Examiner*—J. C. Cannon
*Attorney, Agent, or Firm*—David E. Brook

[57] ABSTRACT

A data bearing card having a magnetizable, transparent, colorless coating thereon is disclosed. The coating can comprise a transparent, colorless plastic matrix containing a dispersed particulate crystalline phase. The dispersed phase is prepared by mixing 20–60% of a rare earth compound containing a colorless ferromagnetic ion such as gadolinium with 0.1–5% of titanium dioxide or zirconium oxide, 0.05–2.5% of an inorganic fluoride salt and the balance up to 100% of a glass forming matrix such as inorganic borates. The mixture is heated above its melting point to form a homogeneous melt and subsequently crystallized. The resulting crystalline product can be ground to any desired particle size for dispersion in the transparent plastic matrix.

In general, the coating composition is useful in all applications where magnetic coatings are presently used. A distinct advantage is its colorless, transparent appearance which extends the range of uses to those applications where it is necessary and/or desirable to have a magnetic coating which is aesthetically pleasing or which is transparent. It is particularly important to form magnetic stripes on data cards such as credit cards, key cards for obtaining access to vending machines and restricted areas, bank checks, inventory control tags, etc. without the concomitant disadvantage of dark coloring, such as the unsightly dark brown associated with iron oxide.

5 Claims, No Drawings

DATA BEARING CARD HAVING AN AESTHETIC, MAGNETIZABLE, COLORLESS, TRANSPARENT COATING THEREON

This is a division of application Ser. No. 407,637, filed Oct. 18, 1973, now U.S. Pat. No. 3,922,430.

BACKGROUND OF THE INVENTION

1. Field of the Invention

This invention relates to magnetic coatings, and more particularly to colorless, transparent magnetic coatings.

2. Description of the Prior Art

Those presently available magnetic coatings are based upon ferric oxide or chromic oxide. In many applications, such as magnetic tape, it is not a significant disadvantage that these materials are colored, i.e. ferric oxide having a brown color and chromic oxide displaying a green color. Nevertheless, there are many substantial applications for magnetic coatings which have been envisioned but wherein color is a significant disadvantage.

One such application is in the field of data bearing cards such as credit cards. These cards usually contain printed information and often contain a photograph of the card holder. The information contained on the face of these cards is covered by a clear, transparent plastic film such as polyvinyl chloride.

The desirability of coating such cards with magnetic stripes which could be encoded with information for machine readable credit cards has long been recognized. See, for example, Report and Recommendations of the Bank Card Standardization Task Force of the American Bankers Association's Bank Card Committee on Encoding Technology for Machine Readable Credit Cards, January, 1971. This report states many reasons why magnetic striping offers the greatest opportunity to reduce fraudulent credit card usage or satisfying other existing requirements. For example, magnetic data storage is proven technology which is reliable for indefinite periods of time and to some extent is existing technology. Magnetic striping also insures adequate data capacity for present and future needs. While no encoding technology would be foolproof against fraud, magnetic striping does offer a very high degree of security because it is difficult to alter, the data is not visible, and it requires a fairly high level of sophistication and collusion to counterfeit. Other advantages are that it can be applied at high speed, has great flexibility, is industrially compatible, is cost competitive, and is very durable.

Most suggestions to date have been to place the magnetic striping on the back of a credit card. This in large measure is due to attempts to avoid seriously defacing the logo, printed and/or photographic information on the face of most credit cards. Defacing results, of course, because presently existing magnetic coatings are non-transparent and colored.

Extensive research has, therefore, been undertaken to develop colorless magnetic materials. This research is evidenced by a large number of recently issued patents in the field. For example, Schafer, U.S. Pat. No. 3,399,957, discloses divalent europium magnetic materials which are transparent and crystalline; nevertheless, these magnetic materials are red. Wickham, U.S. Pat. No. 3,479,132, describes transparent magnetic compounds having a spinel crystal structure with a formula $Li_{11}Fe_6V_7O_{32}$; these magnetic compounds are orange colored.

One patent, Vickery et al., U.S. Pat. No. 3,320,170, describes water-white transparent magnetic glasses formed from phosphate, borate or fluoride matrices containing rare earths such as gadolinium. These materials have not been generally commercially accepted, however. It is felt that the reasons for this are that the Vickery et al. materials have very low Curie points well within the range of ambient temperatures likely to be encountered with a credit card in normal handling and usage. Additionally, it has not been demonstrated that these materials have indices of refraction which match those of commercially available plastic matrices; this, of course, being required to produce transparent colorless plastic coating compositions. Lastly, it is felt that the Vickery et al. materials demonstrate only feeble magnetic properties.

It can be appreciated therefore that there is a great need for transparent, colorless magnetic solids which can be ground and dispersed in transparent plastic matrices to form magnetizable, transparent, colorless plastic coating compositions.

SUMMARY OF THE INVENTION

The invention relates to a data card or sheet bearing a magnetizable, transparent, colorless coating composition. A preferred composition is formed from a transparent colorless plastic matrix having a particulate crystalline magnetizable dispersed phase therein. The index of refraction of both the plastic matrix and particulate dispersed phase are chosen to match so that an overall coating composition is formed which is transparent.

The crystalline dispersed phase comprises a reaction product of 20–60% of a colorless ferromagnetic atom such as gadolinium, 0.5–5% of refractory metal oxides including titanium dioxide and/or zirconium oxide, 0.05–2.5% of an inorganic fluoride salt such as calcium fluoride, and a balance up to 100 weight percent of a glass forming matrix. The glass forming matrix materials customarily employed are inorganic borates, phosphates, oxides or fluorides.

A dispersed phase is formed by forming an intimate mixture of the ingredients and heating it above the melting point of all the ingredients until a homogeneous melt is formed. Thereafter, the melt is cooled in such a way to promote crystallization.

The resulting magnetizable transparent colorless coating compositions can be used in any application wherein it is desired to coat an object with a magnetizable material while not detracting from the aesthetic quality of the object. An extremely important use is the application of magnetic stripes to data cards. Nevertheless, there are many other applications which those skilled in the art will recognize.

DESCRIPTION OF THE PREFERRED EMBODIMENTS

Suitable plastic matrices are those film-forming plastics which produce colorless transparent coatings. This includes vinyl polymers such as polyvinyl chloride, and polyvinylidene chloride; acrylic polymers such as polymethyl methacrylate, polyacrylic acid, etc.; polyesters such as polyethylene terephthalate; cellulosics such as cellulose acetate butyrate, etc.; and many others. Generally, all of these transparent colorless plastic binders have indices of refraction in the range of 1.3 to 1.6.

The plastic matrices are made magnetizable by incorporating therein from about 10–60%, and preferably 20–45% by volume, of a particulate crystalline solid reaction product having magnetic properties. The dispersed phase is formed by reacting at least four ingredients together at elevated temperatures above the melting point of the highest melting ingredient and subsequently crystallizing the melt.

One ingredient in the dispersed solid phase is a colorless ferromagnetic atom. Suitable ferromagnetic ions include gadolinium, dysprosium, holmium, thulmium and terbium. Compounds containing the ferromagnetic atoms are used and are present in an amount of about 20% to about 60% to provide a significant degree of magnetic capability for the dispersed phase. A preferred rare earth compound is gadolinium oxide because gadolinium has a large magnetic moment and because gadolinium oxide is relatively inexpensive contrasted to other potential ingredients. Preferably, the gadolinium oxide will be present in an amount of from about 30% to about 50% by weight.

Refractory metal oxides such as titanium dioxide, zirconium oxide or mixtures of these are included in the ingredients for the solid crystalline product. Generally these are present in an amount of from 0.1–5%, and are preferably employed in amounts of 1–3%. Although the function of these refractory metal oxides is not fully understood, it is believed that they act as crystallization promoters thereby helping to attain a relatively high degree of ordering and/or crystallinity in the final reaction product.

Inorganic fluoride salts are also added to the mixture used to form the colored crystalline dispersed phase. Suitable fluorides include calcium fluoride, barium fluoride, magnesium fluoride and strontium fluoride. Generally, the fluorides are used in an amount of 0.05–2.5%, and preferably 0.5–1.5% by weight. Calcium fluoride is a particularly preferred fluoride salt because it is readily available in pure form and it has a low melting point. As with the refractory metal oxides, the function of the fluorides is not really understood, but it is believed that the fluoride salt acts to reduce the viscosity of the homogeneous melt formed from various ingredients in the reaction mixture. The lowered viscosity tends to result in better diffusion of the various ions in the melt thereby increasing their mobility and the probability of crystal formation.

The balance of the reaction mixture, up to 100 weight percent, comprises glass forming matrix materials such as inorganic oxides, borates, phosphates and/or fluorides. Suitable oxides include magnesium oxide, zinc oxide, beryllium oxide, lead oxide, boron oxide, etc. Suitable borates can be provided by adding boric acid or anhydride and an appropriate salt such as calcium oxide, strontium oxide, barium oxide, zinc oxide, etc. Suitable phosphates include sodium and potassium phosphate or pyrophosphate. Suitable fluorides include magnesium, calcium, strontium, barium, sodium, potassium or lithium or fluoride.

After the reaction mixture is formed, it is heated above its melting point, i.e., the melting point of the highest melting ingredient present, and formed into a homogeneous melt. Typically, temperatures of at least about 1,100°C. are required. After a homogeneous melt is formed, it is cooled in a manner which will produce good ordering in the resulting product, or good crystallization. This can be done, for example, by rapidly quenching the reaction mixture to a temperature well below that at which crystallization occurs, and subsequently reheating the product to an elevated temperature at which crystallization occurs followed by gradual cooling. The resulting reaction product has properties which make it ideal for use in the coatings described herein. It has a large magnetic moment, for example, which makes it capable of being easily magnetized to store data. This results from the addition of significant percentages of a ferromagnetic atom which gives the solid product ferromagnetic or ferrimagnetic properties.

Additionally, the resulting product can be ground to any particle size desired for dispersion in a plastic matrix. Techniques for forming coatings are well known to those skilled in the art, and will not be described in detail herein.

Most importantly, the crystalline solid product is capable of forming transparent colorless coating compositions when it is dispersed in the plastic matrix. The crystalline solids are not always entirely transparent and may be slightly hazy, but when they are powdered and dispersed in the plastic matrix they form an essentially transparent colorless coating. This is because they have indices of refraction in the range corresponding to those of the most commonly used plastic matrix materials, i.e., from about 1.3 to about 1.6. The refractive index may be varied within that range by varying the various proportions of the glass forming matrix materials. For example, if an index of refraction is desired towards the higher end of the range, more barium oxide or zinc oxide can be added. On the other hand, if an index of refraction nearer the lower end of the range is required, more calcium oxide or magnesium oxide can be added.

As mentioned supra, an important application for the magnetizable coatings described herein is in their application to data bearing cards such as credit cards. Since the coatings can be colorless, they can be applied directly onto the front surface of a card. They can even be applied over a photograph on the card's surface. Information can be encoded using conventional magnetic recorders, the magnetic information being either erasable, fixed or a combination of both.

In describing the invention, the terms "colorless" and "transparent" are used to mean that the coatings are substantially transparent to wavelengths in the visible range. The terms "card" or "data bearing card" are used in their broadest sense to include cards, sheets, tags, badges, labels, overlays, checks, tokens, etc.

Those skilled in the art will recognize many equivalents to the preferred embodiments described herein. Such equivalents are intended to be encompassed within the appended claims.

The following examples illustrate the invention more specifically.

EXAMPLE 1

An intimate mixture of the following ingredients was blended and charged to a 50 cc. platinum crucible:

| | |
|---|---|
| 15 grams | gadolinium oxide |
| 20 grams | boron oxide |
| 10 grams | barium carbonate |
| 0.25 grams | calcium fluoride |
| 0.5 grams | titanium dioxide (Caboteen). |

The blend was heated to 1150°C. and maintained at this temperature for about 30 minutes under constant stirring with a platinum stirrer. The heated melt was cast onto an aluminum chill plate maintained at room temperature, and subsequently reheated to about 700°C., a temperature well below the freezing point. The product was then allowed to cool slowly to room temperature. A solid, colorless, transparent, product resulted which was ground through a 400 mesh seive.

The refractive index of the particles was about 1.55. The particles were shown to be crystalline because they exhibited the Tyndall effect. By placing the particles in a curve tracer, it was established that a B-H curve existed for the particles. Also, the particles were attracted by a magnet.

EXAMPLE 2

The procedure of Example 1 was followed substituting the following composition:

| | |
|---|---|
| 15 grams | gadolinium oxide |
| 20 grams | boron oxide |
| 10 grams | calcium carbonate |
| 0.25 grams | calcium fluoride |
| 0.5 grams | titanium dioxide. |

The refractive index of the resulting colorless solid was 1.35. This product also possessed magnetic properties.

EXAMPLE 3

The procedure of Example 1 was followed substituting the following ingredients:

| | |
|---|---|
| 15 grams | gadolinium oxide |
| 7 grams | calcium carbonate |
| 3 grams | barium carbonate |
| 0.25 grams | calcium fluoride |
| 0.5 grams | titanium dioxide. |

The resulting product had a refractive index of 1.42, and also possessed magnetic properties.

What is claimed is:

1. A magnetizable, transparent, colorless coating composition, comprising:
   a. a transparent, colorless plastic matrix having an index of refraction from about 1.3 to about 1.6; and,
   b. from about 10% to about 60% by weight of a particulate, crystalline, dispersed phase, said crystalline dispersed phase having an index of refraction which matches that of said plastic and which consists essentially of a crystalline reaction product from: (1) about 20% to about 60% of a compound containing a colorless ferromagnetic atom; (2) about 0.1% to about 5% of a refractory metal oxide selected from titanium dioxide, zirconium oxide, and a mixture of both; (3) about 0.05% to about 2.5% of an inorganic fluoride salt; and, (4) a balance of up to 100 weight percent of a glass forming matrix.

2. A coating composition of claim 1 wherein said ferromagnetic atom comprises a rare earth selected from gadolinium, dysprosium, terbium, holmium and thulmium.

3. A coating composition of claim 2 wherein said glass forming matrix comprises an inorganic oxide, inorganic phosphate, inorganic borate, inorganic fluoride or mixtures of these.

4. A coating composition of claim 3 wherein said rare earth compound comprises gadolinium oxide.

5. A data bearing card comprising a plastic substrate with a photograph thereon, said photograph being overcoated with an optically transparent plastic sheet bonded to said photographic print, and a magnetizable coating of claim 1 on said optically transparent plastic sheet and overlaying said photograph.

* * * * *